(12) United States Patent
Mao et al.

(10) Patent No.: US 11,015,941 B2
(45) Date of Patent: May 25, 2021

(54) METHOD AND APPARATUS FOR PATH BASED MAP MATCHING

(71) Applicant: HERE Global B.V., Eindhoven (NL)

(72) Inventors: Qi Mao, Arlington, TX (US); Qin Chen, Chicago, IL (US); Sanjay Kumar Boddhu, Aurora, IL (US)

(73) Assignee: HERE GLOBAL B.V., Eindhoven (NL)

( * ) Notice: Subject to any disclaimer, the term of this patent is extended or adjusted under 35 U.S.C. 154(b) by 294 days.

(21) Appl. No.: 15/990,264

(22) Filed: May 25, 2018

(65) Prior Publication Data

US 2019/0360819 A1 Nov. 28, 2019

(51) Int. Cl.
*G01C 21/32* (2006.01)
*G01C 21/36* (2006.01)

(52) U.S. Cl.
CPC .......... *G01C 21/32* (2013.01); *G01C 21/362* (2013.01)

(58) Field of Classification Search
CPC .......... G01S 13/08; G01S 13/42; G01S 13/50; G01S 13/52; G01S 13/58; G01S 5/00; G01S 5/0009; G01S 5/0018; G01S 5/00027; G01S 5/0036; G01S 5/0045; G01S 5/0054; G01S 5/0063; G01S 5/02; G01S 5/021; G01S 5/02213; G01C 31/3181; G01C 22/00; G01C 21/00; G01C 21/005; G01C 21/10; G01C 21/16; G01C 21/20; G01C 21/26; G01C 21/28; G01C 21/30; G01C 21/32; G01C 21/34; G01C 21/3415; G01C 21/343; G01C 21/3492; G01C 21/3602; G01C 21/3614; G01C 21/362; G01C 21/3658; G01C 21/3667; G01C 21/367;
(Continued)

(56) References Cited

U.S. PATENT DOCUMENTS 7,957,897 B2 * 6/2011 Basnayake ............. G01C 25/00
701/501
8,543,320 B2 9/2013 Zheng et al.
(Continued)

OTHER PUBLICATIONS

Newson et al., "Hidden Markov Map Matching Through Noise and Sparseness", Microsoft Research, Microsoft Corporation, (2009).
Shan et al., "Cobweb: a Robust Map Update System Using Gps Trajectories" Institutional Knowledge at Singapore Management University, (Sep. 2015).
(Continued)

*Primary Examiner* — Anthony R Jimenez
(74) *Attorney, Agent, or Firm* — Alston & Bird LLP

(57) ABSTRACT

A method map matches probe data to a candidate road segment or node. Methods may include: searching for candidate road segments or nodes for each probe data point to be matched to, where searching for candidate road segments or nodes includes: searching within a predefined radius of each probe data point for road segments or nodes and in response to no road segments or nodes being found within the predefined radius of the respective probe data point, iteratively increasing the predefined radius and searching again until a predefined maximum radius is reached or at least two road segment candidates or node candidates are found; map matching each probe data point to a respective road segment candidate or node candidate based on the road segment candidate or node candidate found in the search; and generating a path based on the map matched probe data points from a respective probe.

20 Claims, 11 Drawing Sheets

(58) Field of Classification Search
CPC .... G01C 21/3691; G01C 221/32; G01R 1/06; G01R 1/067; B60W 10/00; B60W 2420/00; B60W 2550/00; B60W 2550/40; B60W 2550/402; B60W 2550/406; B60W 2550/408; B60W 2750/00; B60W 2750/40; G08G 1/00; G08G 1/01; G08G 1/0112; G08G 1/0125; G08G 1/017; G08G 1/04; G08G 1/042; G08G 1/065; G09G 2340/045; G09G 2360/121; G09G 2360/122; H04W 4/185; H04W 64/00; G06F 3/14; G06F 16/00; G06F 16/20; G06F 16/29; G06F 16/2475
USPC ........................................................ 701/430

See application file for complete search history.

(56) References Cited

U.S. PATENT DOCUMENTS

| | | | |
|---|---|---|---|
| 8,711,181 B1* | 4/2014 | Nourse | G06F 16/24575 345/660 |
| 8,949,021 B2 | 2/2015 | Witmer | |
| 9,429,657 B2* | 8/2016 | Sidhu | G01S 19/34 |
| 9,500,486 B2 | 11/2016 | Gale et al. | |
| 9,816,823 B2 | 11/2017 | Wang et al. | |
| 2012/0004845 A1 | 1/2012 | Kmiecik et al. | |
| 2017/0082453 A1* | 3/2017 | Fischer | G01C 21/3626 |
| 2017/0219360 A1 | 8/2017 | Cui et al. | |

OTHER PUBLICATIONS

Yokoo et al., "Road Network Structure and Speeding Using GPS Data", University of Minnesota, (Jul. 25, 2015).

* cited by examiner

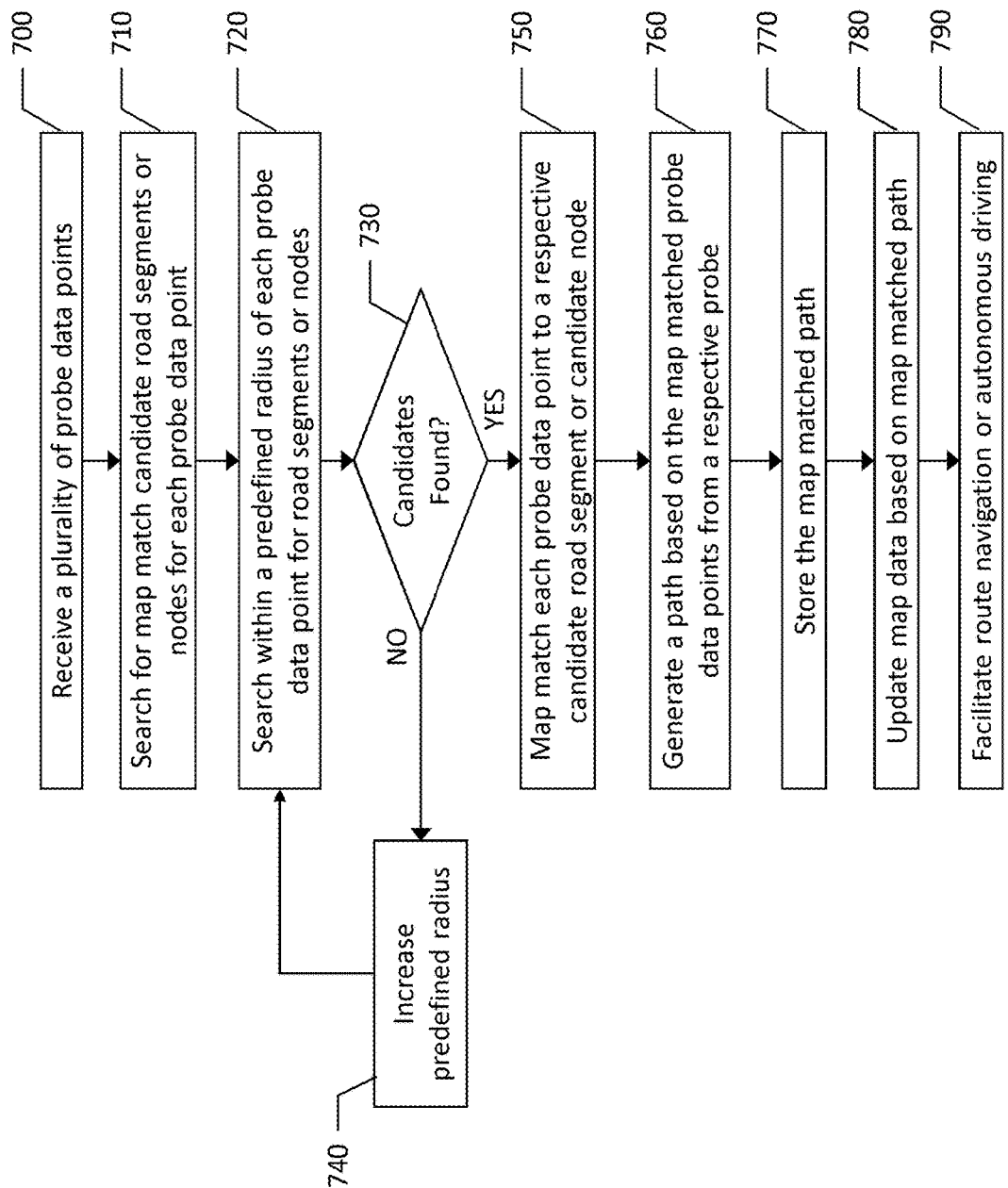

METHOD AND APPARATUS FOR PATH BASED MAP MATCHING

TECHNOLOGICAL FIELD

Embodiments described herein generally relate to path based map matching of probe data, and more particularly, to accurately map matching probe data to leverage crowdsourced map data from probes traveling along a map matched road segment.

BACKGROUND

Probe points are frequently captured by global positioning systems ("GPS"), navigation systems or the like. Each probe point is associated with a location, such as may be expressed in terms of latitude and longitude. Some probe points are also associated with a heading and a speed at which the GPS system or the navigation system was moving at the time at which the probe point was captured.

In some instances, such as within a region for which a map consisting of a plurality of road segments has been created, the probe points may be matched to the map in order to identify the location along a road segment at which the probe point was captured. Map matching may be performed in real time, such as by navigation systems in order to identify the location of the probe point relative to the road segments represented by the map. For example, navigation systems mounted within a vehicle may perform real time map matching in order to depict the relative position of a probe point upon a map, thereby illustrating the current location of the vehicle. Map matching for real time applications may only utilize the path of probe points up to the most recent probe point since those are the only probe points that are known. Alternatively, map matching may rely upon post-processing, such as in instances in which the probe points captured by a plurality of GPS systems or navigation systems are matched to the road segments represented by a map for traffic estimation or other purposes. The accuracy of the map matching provided by post-processing may be improved relative to the map matching for real time applications since probe points captured subsequent in time to the probe point currently being processed are also known and may be referenced during the post-processing.

A variety of probe-centric map matching techniques have been developed. These map matching techniques include map matching techniques that utilize geometric analysis including point-to-point analysis, point-to-curve analysis and trajectory techniques. Other map matching techniques utilize a topological analysis of the road network to improve accuracy and performance. Some map matching techniques utilize probabilistic map-matching algorithms. The probabilistic map-matching algorithms attempt to identify the most probable road segment in some confidence region about a respective probe point. Additionally or alternatively, probabilistic map-matching algorithms may attempt to identify the most probable path in addition to the most probable road segment. The probabilistic map-matching algorithms may include, for example, Viterbi and hidden Markov model techniques. Further, map-matching techniques may include other types of map-matching algorithms including those that utilize Kalman and extended Kalman based techniques and those that utilize particle filters.

Whether performed in real time or as a post-processing technique, map matching has been a probe-centric process in which each probe point is analyzed to identify the closest road segment and the projection of the probe point onto the closest road segment. In order to identify the closest road segment, a separate spatial search is generally conducted for each probe point; even in instances in which a probe point is spaced a substantial distance from any road segment. Thus, the number of spatial searches to be conducted is generally proportional to the number of probe points.

Spatial searches are computationally expensive. For example, probe-centric map matching techniques for large probe data sets, such as millions of probe points, can incur substantial execution time and costs since the number of spatial searches is proportional to the number of probe points. Thus, map matching and, in particular, the spatial searches for each of the probe points may become a limiting factor at least for real time applications.

BRIEF SUMMARY

A method, apparatus, and computer program product are provided in accordance with an example embodiment for map matching probe data points and sequences of probe data points to road segments and nodes of road segments. Embodiments provided herein may include a mapping system having a memory with map data stored thereon and processing circuitry. The processing circuitry may be configured to: receive a plurality of probe data points, each probe data point received from a probe apparatus among a plurality of probe apparatuses, each apparatus including one or more sensors and being onboard a respective vehicle, where each probe data point includes location information associated with the respective probe apparatus. The processing circuitry may further search for candidate road segments or nodes for each probe data point to be matched to, where the processing circuitry configured to search for candidate road segments or nodes may include processing circuitry configured to: search within a predetermined radius of each probe data point for road segments or nodes; in response to no road segments or nodes being found within the predefined radius of the respective probe data point, iteratively increase the predefined radius and search again until a predefined maximum radius is reached or at least two road segment candidates or node candidates are found; map each probe data point to a respective road segment candidate or node candidate based on the road segment or node candidate found in the search; generate a path based on the map matched probe data points from a respective probe; cause storage of the map matched path in the memory; update map data based, at least in part, on the map matched path; and facilitate at least one of route navigation or at least semi-autonomous driving based on the updated map data.

According to some embodiments, each probe data point may include a location, a speed, and a timestamp, where each probe apparatus generates a sequence of probe data points. The processing circuitry may be configured to generate a trajectory for a probe apparatus based on a first probe data point and a next probe data point in a sequence of at least two probe data point received from the probe apparatus in response to a distance between the first probe data point and the next probe data point being less than a predefined multiple of the greater of the speed of the first probe data point and the next probe data point multiplied by the time difference between the first probe data point and the next probe data point. The processing circuitry may also be configured to separate a first probe data point from a next probe data point in a sequence of at least two probe data points received from the probe apparatus into different trajectories in response to a distance between the first probe data point and the next probe data point being more than a predefined multiple of the greater of the speed of the probe data point and the next probe data point multiplied by the time difference between the first probe data point and the next probe data point.

The processing circuitry configured to search for candidate road segments or nodes for each probe data point to be matched to may optionally include causing the apparatus to determine as a candidate, from two or more substantially parallel roads having different directions of travel, a road segment or node having a direction of travel that is less than ninety degrees away from a heading of the probe data point. The processing circuitry may be configured to search for candidate road segments or nodes for each probe data point to be map matched to may optionally include processing circuitry configured to: determine if a respective probe data point is within a predefined distance of an intersection; and exclude the respective probe data point from inclusion in the generation of the path in response to the probe data point being proximate the intersection. The processing circuitry configured to map match each probe data point to a respective road segment candidate or node candidate found in the search may include processing circuitry configured to discard a probe data point from the path in response to determining that a heading of the probe data point conflicts with a direction of the map matched road segment or node.

Embodiments provided herein may include an apparatus having at least one processor and at least one memory including computer program code. The at least one memory and the computer program code may be configured to, with the processor, cause the apparatus to: receive a plurality of probe data points, each probe data point received from a probe apparatus of among a plurality of probe apparatuses, each probe apparatus having one or more sensors and being onboard a respective vehicle, where each probe data point includes location information associated with the respective probe apparatus. The apparatus may further be caused to search for candidate road segments or nodes for each probe data point to be map matched to, where causing the apparatus to search for candidate road segments or nodes may include causing the apparatus to: search within a predefined radius of each probe data point for road segments or nodes; in response to no road segments or nodes being found within the predefined radius of the respective probe data point, iteratively increase the predefined radius and search again until a predefined maximum radius is reached or at least two road segment candidates or node candidates are found; map match each probe data point to a respective road segment candidate or node candidate based on the road segment candidate or node candidate found in the search; generate a path based on the map matched probe data points from a respective probe; cause storage of the map matched path in the memory; update map data based, at least in part, on the map matched path; and facilitate at least one of route navigation or at least semi-autonomous driving based on the updated map data.

According to an example embodiment, each probe data point may include a location, a speed, and a timestamp, where only probe data points satisfying a predetermined threshold are used to generate the path. Each probe apparatus may generate a sequence of probe data points, wherein the apparatus of example embodiments described herein may be further caused to generate a trajectory for a probe apparatus based on a first probe data point and a next probe data point in a sequence of at least two probe data points received from the probe apparatus in response to a distance between the first probe data point and the next probe data point being less than a predefined multiple of the greater of the speed of the first probe data point and the next probe data point multiplied by the time difference between the first probe data point and the next probe data point. In response to the first probe data point and the next probe data point being more than a predefined multiple of the greater of the speed of the first probe data point and the next probe data point multiplied by the time difference between the first probe data point and the next probe data point, the first probe data point and the next probe data point may be separated into two different trajectories.

The apparatus of example embodiments may be caused to determine as a candidate, from two or more substantially parallel roads having different directions of travel, a road segment or node having a direction of travel that is less than ninety degrees away from a heading of the probe data point. Causing the apparatus to search for candidate road segments or nodes for each probe data point to be map matched to may optionally include causing the apparatus to: determine if a respective probe data point is within a predefined distance of an intersection; and exclude the respective probe data point from inclusion in the generation of the path in response to the probe data point being proximate the intersection. Causing the apparatus to map match each probe data point to a respective road segment candidate or node candidate based on the road segment candidate or node candidate found in the search may include causing the apparatus to discard a probe data point from the path in response to determining that a heading of the probe data point conflicts with a direction of the map matched road segment or node.

Embodiments described herein may provide a method that includes receiving a plurality of probe data points, each probe data point received from a probe apparatus of a plurality of probe apparatuses, each probe apparatus including one or more sensors and being on board a respective vehicle, where each probe data point includes location information associated with the respective probe apparatus. Methods may further include: searching for candidate road segments or nodes for each probe data point to be matched to, where searching for candidate road segments or nodes includes: searching within a predefined radius of each probe data point for road segments or nodes; in response to no road segments or nodes being found within the predefined radius of the respective probe data point, iteratively increasing the predefined radius and searching again until a predefined maximum radius is reached or at least two road segment candidates or node candidates are found; map matching each probe data point to a respective road segment candidate or node candidate based on the road segment candidate or node candidate found in the search; generating a path based on the map matched probe data points from a respective probe; causing storage of the map matched path in a memory; updating map data based, at least in part, on the map matched path; and facilitating at least one of route navigation or at least semi-autonomous driving based on the updated map data.

According to some embodiments, each probe data point includes a location, a speed, and a timestamp, where only probe data points satisfying a predetermined speed threshold are used to generate the path. Each probe apparatus may generate a sequence of probe data points, where methods may include generating a trajectory for a probe apparatus based on a first probe data point and a next probe data point in a sequence of at least two probe data points received from the probe apparatus in response to a distance between the first probe data point and the next probe data point being less than a predefined multiple of the greater of the speed of the first probe data point and the next probe data point multiplied by the difference between the first probe data point and the next probe data point. The first probe data point and the next probe data point may be separated into two different trajectories in response to the distance between them being greater than a predefined multiple of the greater of the speed of the first probe data point and the next probe data point multiplied by the time difference between the first probe data point and the next probe data point.

Searching for candidate road segments or nodes for each probe data point to be matched to may further include determining as a candidate, from two or more substantially parallel roads having different directions of travel, a road segment or node having a direction of travel that is less than ninety degrees away from a heading of the probe data point. Searching for candidate road segments or nodes for each probe data point to be map matched to may include: determining if a respective probe data point is within a predefined distance of an intersection; and excluding the respective probe data point from inclusion in the generation of the path in response to the probe data point being proximate the intersection.

Embodiments described herein may provide an apparatus that includes means for receiving a plurality of probe data points, each probe data point received from a probe apparatus of a plurality of probe apparatuses, each probe apparatus including one or more sensors and being on board a respective vehicle, where each probe data point includes location information associated with the respective probe apparatus. Example apparatuses may further include: means for searching for candidate road segments or nodes for each probe data point to be matched to, where searching for candidate road segments or nodes includes: means for searching within a predefined radius of each probe data point for road segments or nodes; in response to no road segments or nodes being found within the predefined radius of the respective probe data point, means for iteratively increasing the predefined radius and searching again until a predefined maximum radius is reached or at least two road segment candidates or node candidates are found; means for map matching each probe data point to a respective road segment candidate or node candidate based on the road segment candidate or node candidate found in the search; means for generating a path based on the map matched probe data points from a respective probe; means for causing storage of the map matched path in a memory; means for updating map data based, at least in part, on the map matched path; and means for facilitating at least one of route navigation or at least semi-autonomous driving based on the updated map data.

According to some embodiments, each probe data point includes a location, a speed, and a timestamp, where only probe data points satisfying a predetermined speed threshold are used to generate the path. Each probe apparatus may generate a sequence of probe data points, where embodiments of the apparatus may include means for generating a trajectory for a probe apparatus based on a first probe data point and a next probe data point in a sequence of at least two probe data points received from the probe apparatus in response to a distance between the first probe data point and the next probe data point being less than a predefined multiple of the greater of the speed of the first probe data point and the next probe data point multiplied by the difference between the first probe data point and the next probe data point. The first probe data point and the next probe data point may be separated into two different trajectories in response to the distance between them being greater than a predefined multiple of the greater of the speed of the first probe data point and the next probe data point multiplied by the time difference between the first probe data point and the next probe data point.

The means for searching for candidate road segments or nodes for each probe data point to be matched to may further include means for determining as a candidate, from two or more substantially parallel roads having different directions of travel, a road segment or node having a direction of travel that is less than ninety degrees away from a heading of the probe data point. The means for searching for candidate road segments or nodes for each probe data point to be map matched to may include: means for determining if a respective probe data point is within a predefined distance of an intersection; and means for excluding the respective probe data point from inclusion in the generation of the path in response to the probe data point being proximate the intersection.

BRIEF DESCRIPTION OF THE DRAWINGS

Figure 1:
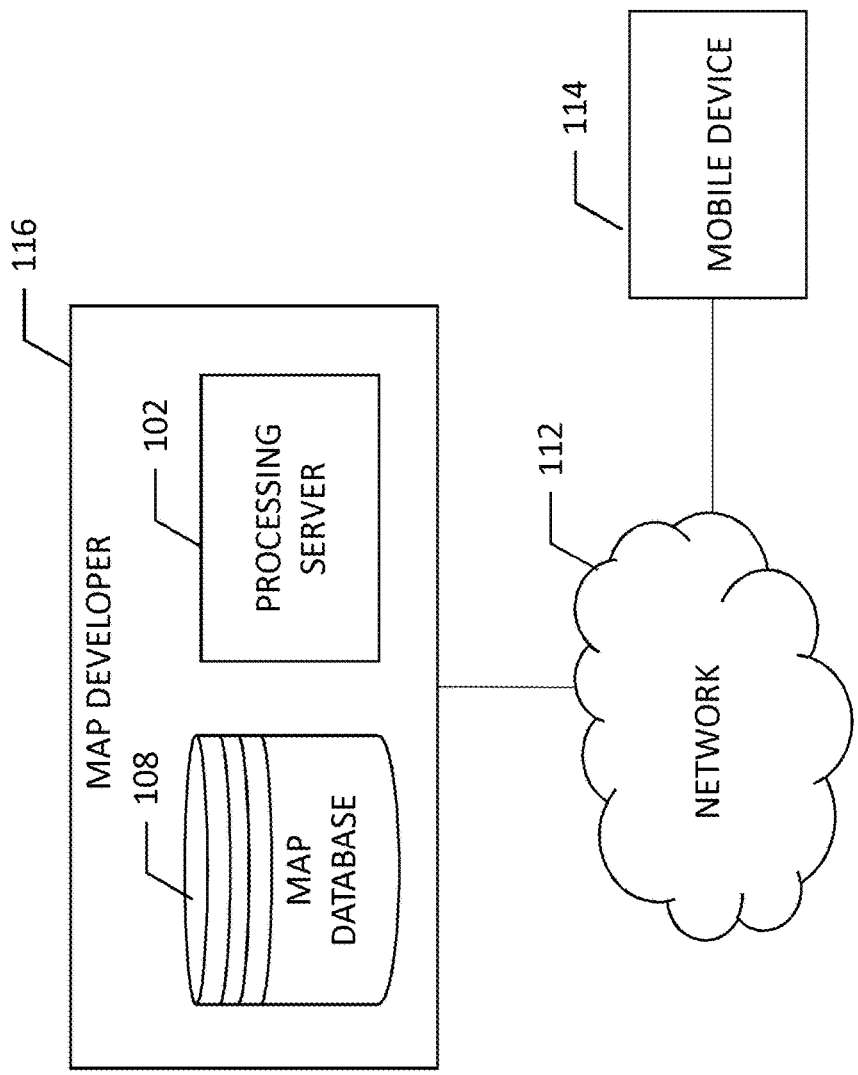
Figure 2:
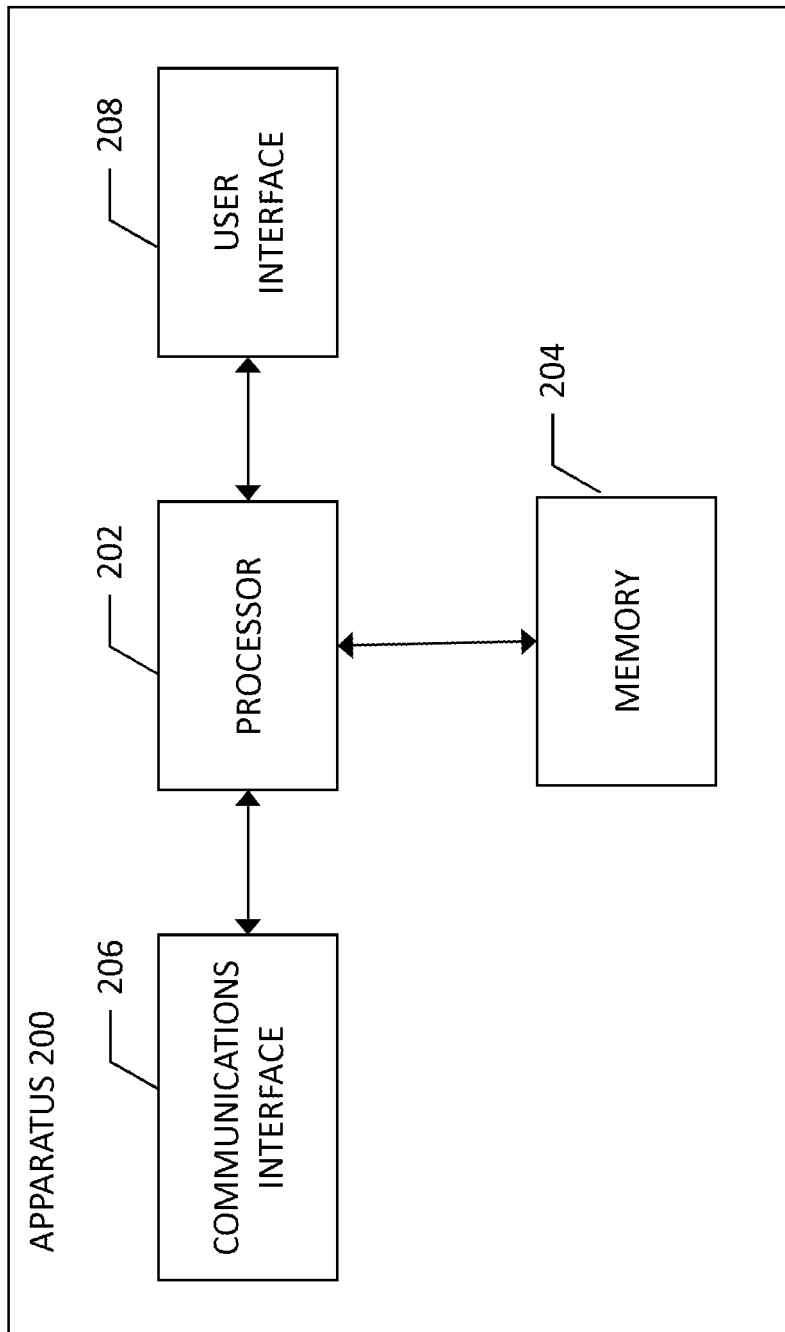
Figure 3:
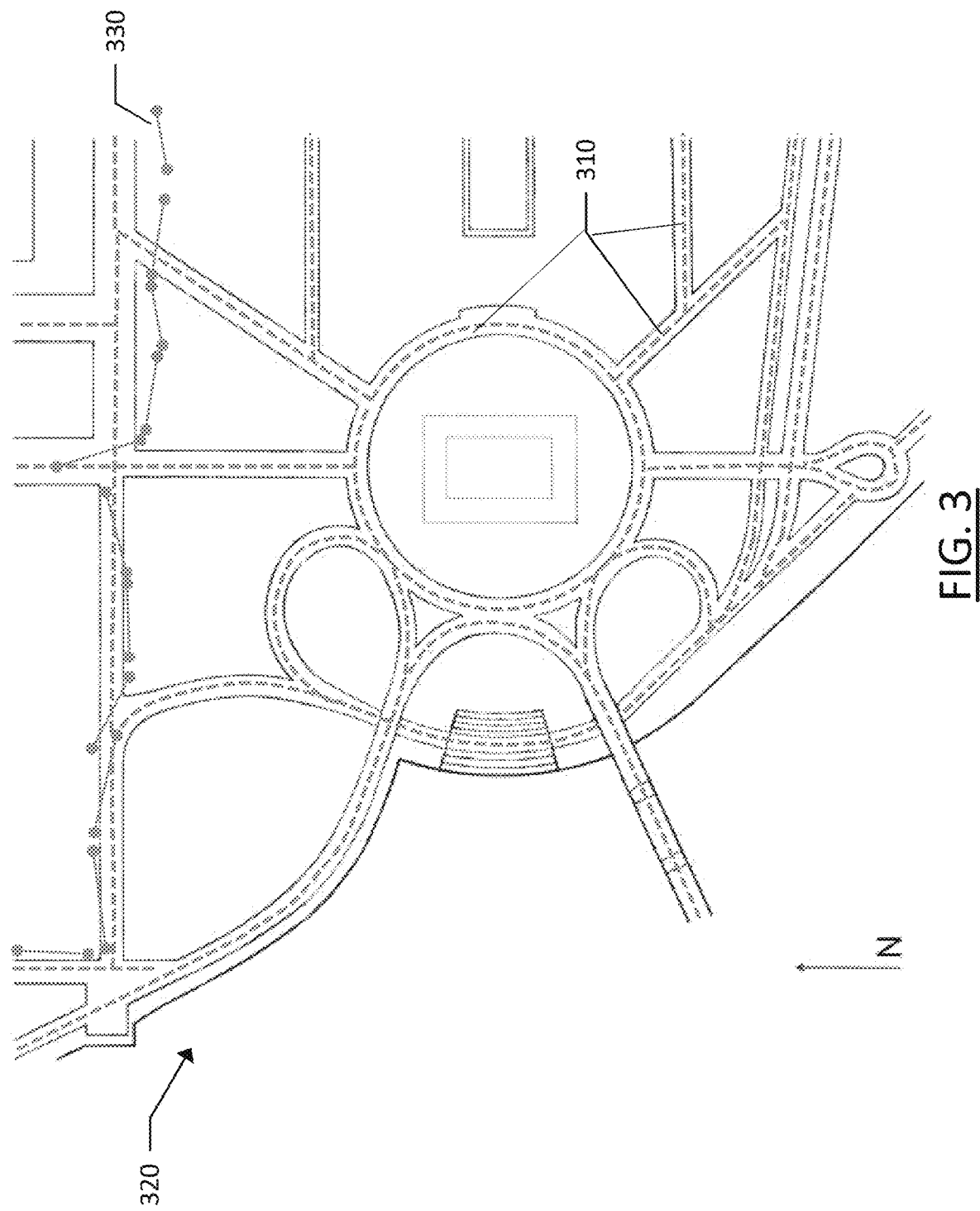
Figure 4:
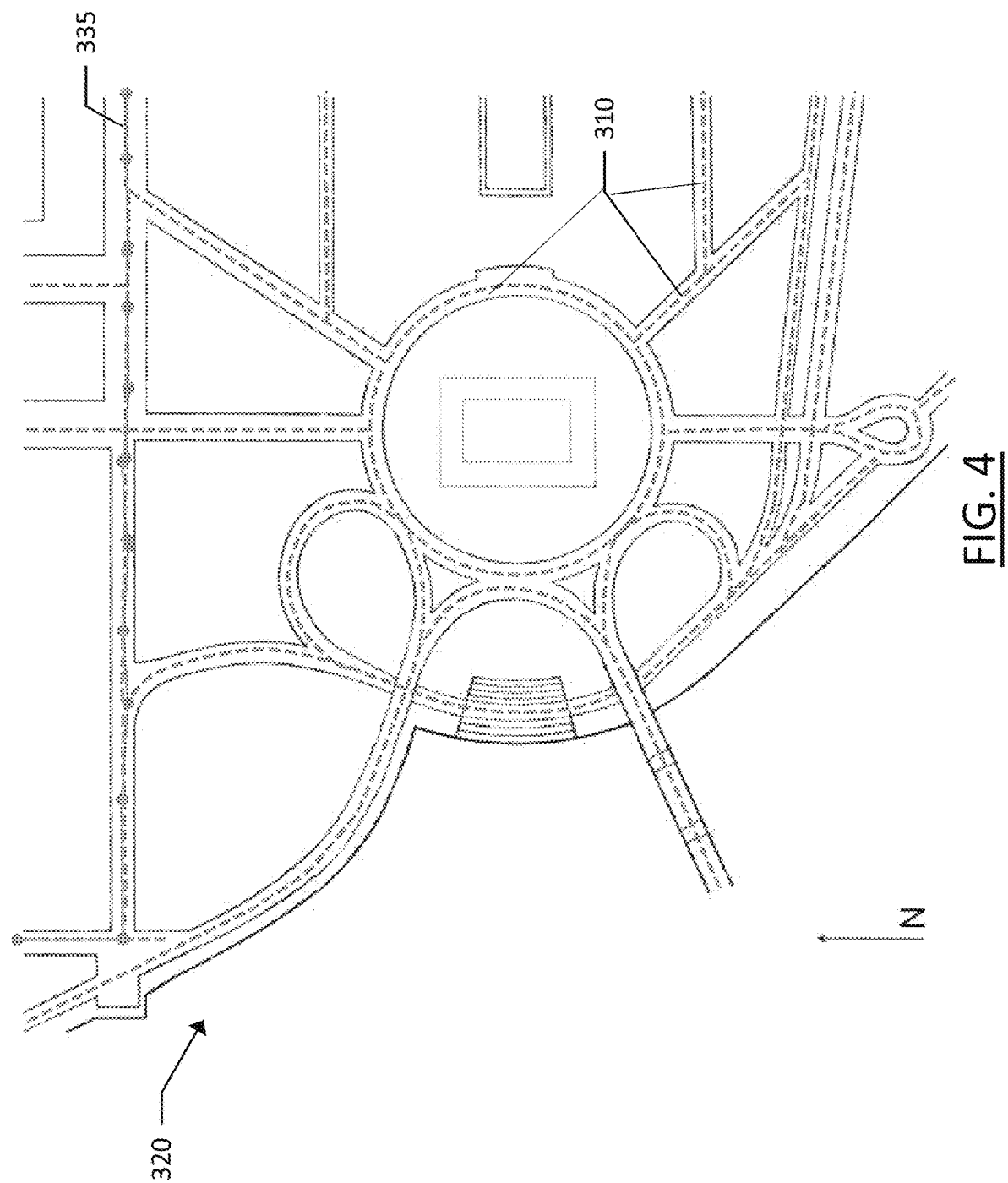
Figure 5:
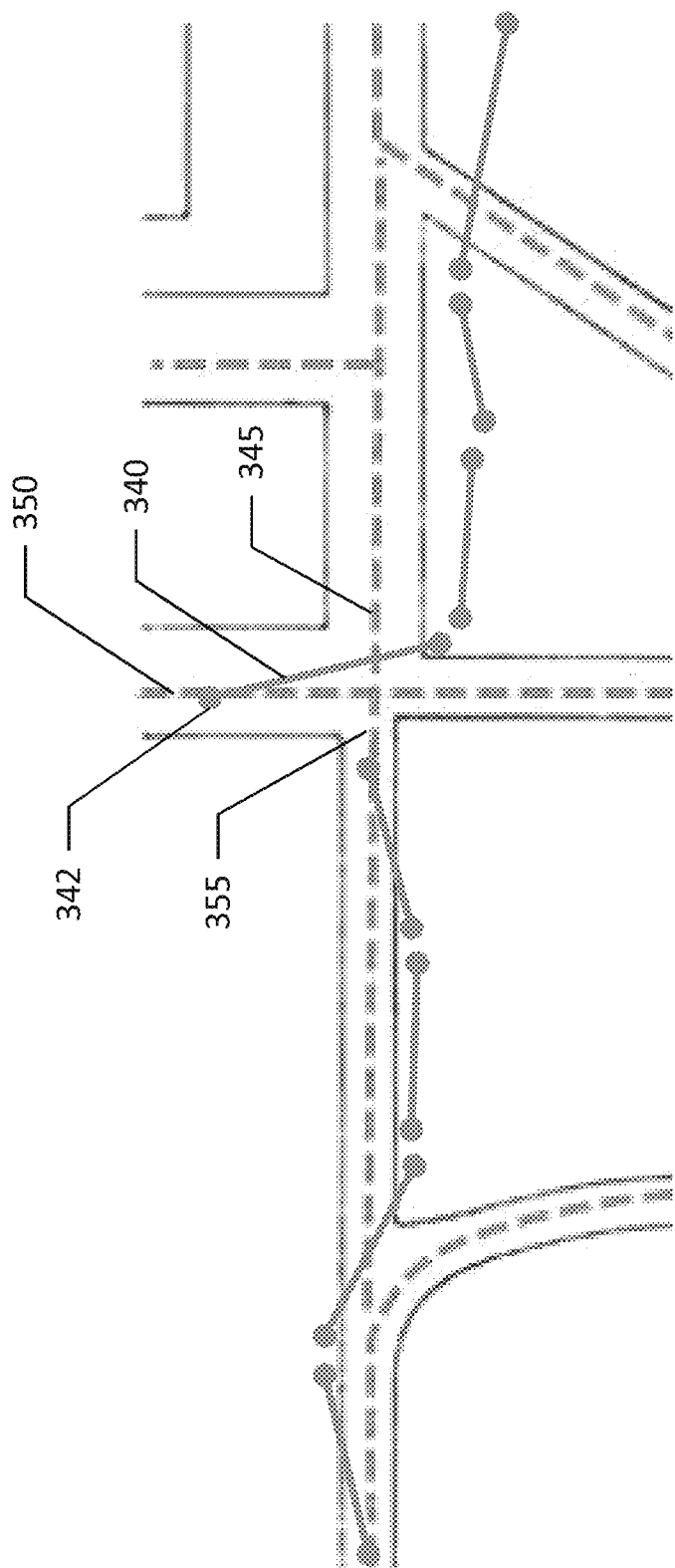
Figure 6:
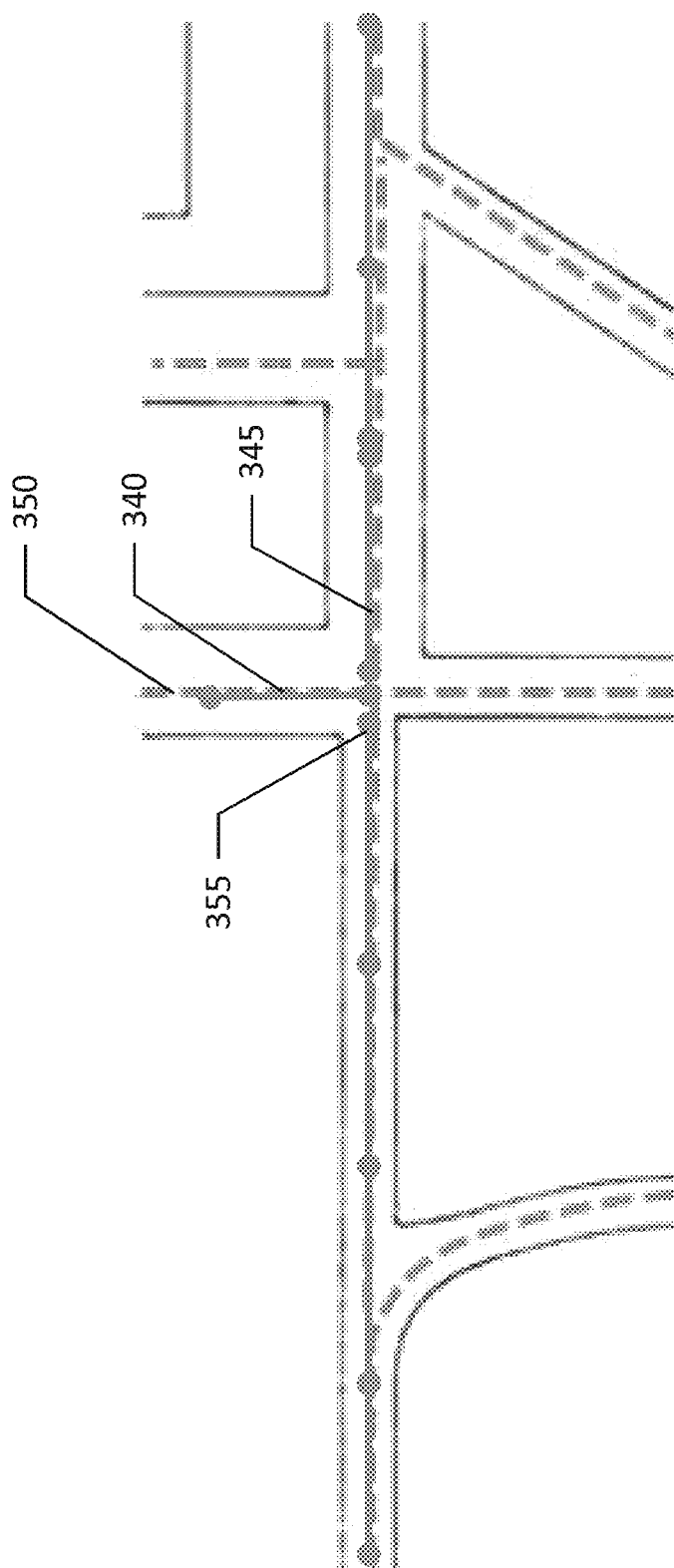
Figure 7:
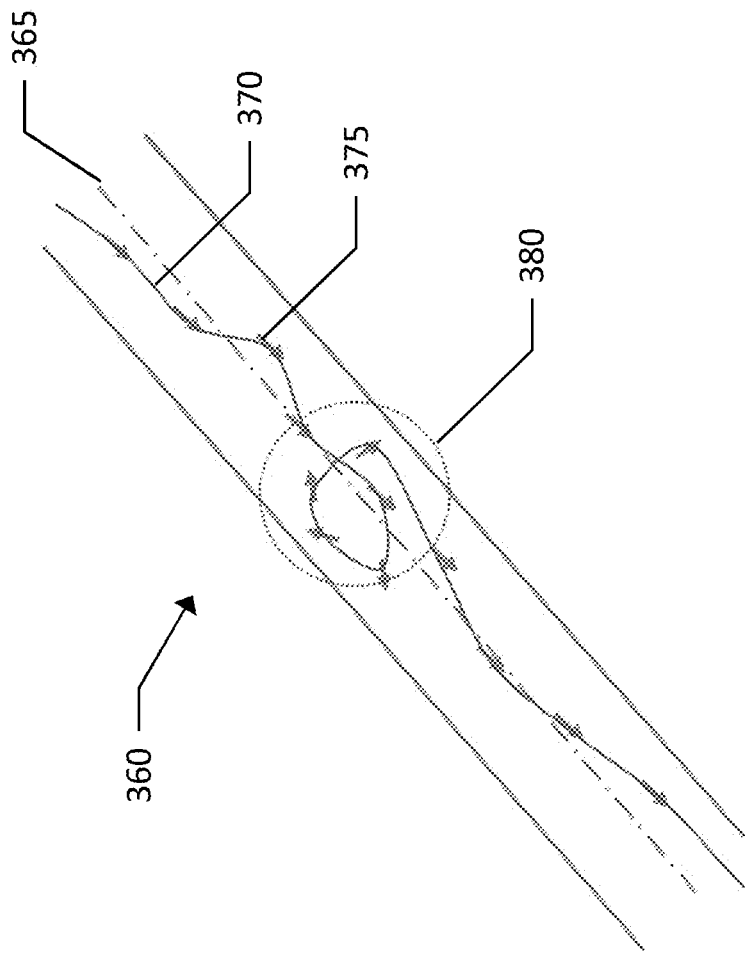
Figure 8:
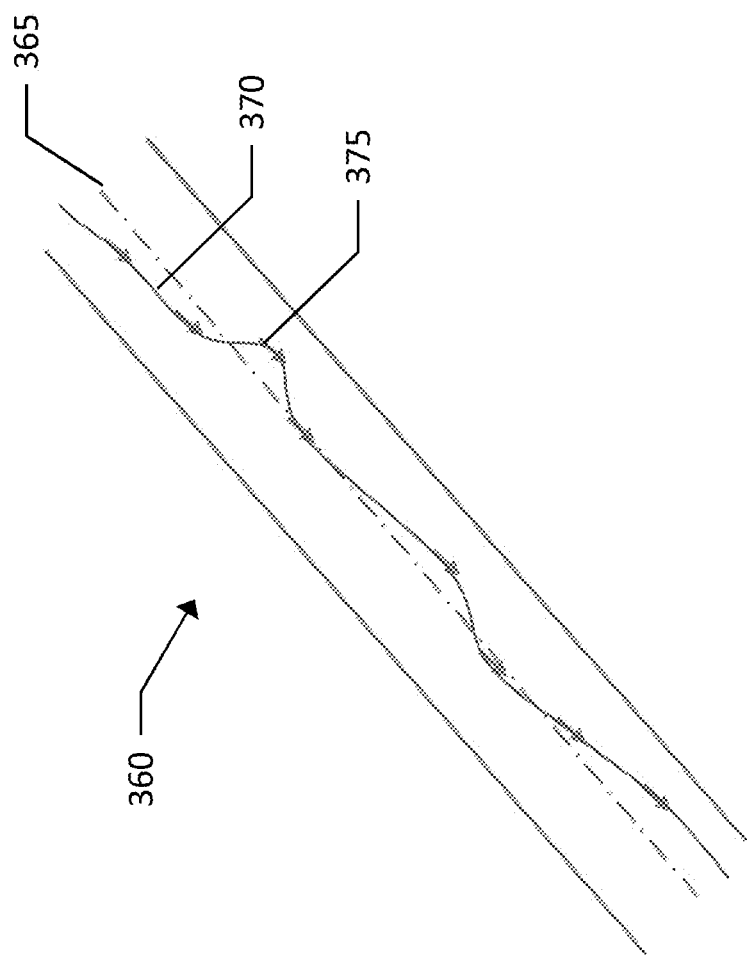
Figure 9A:
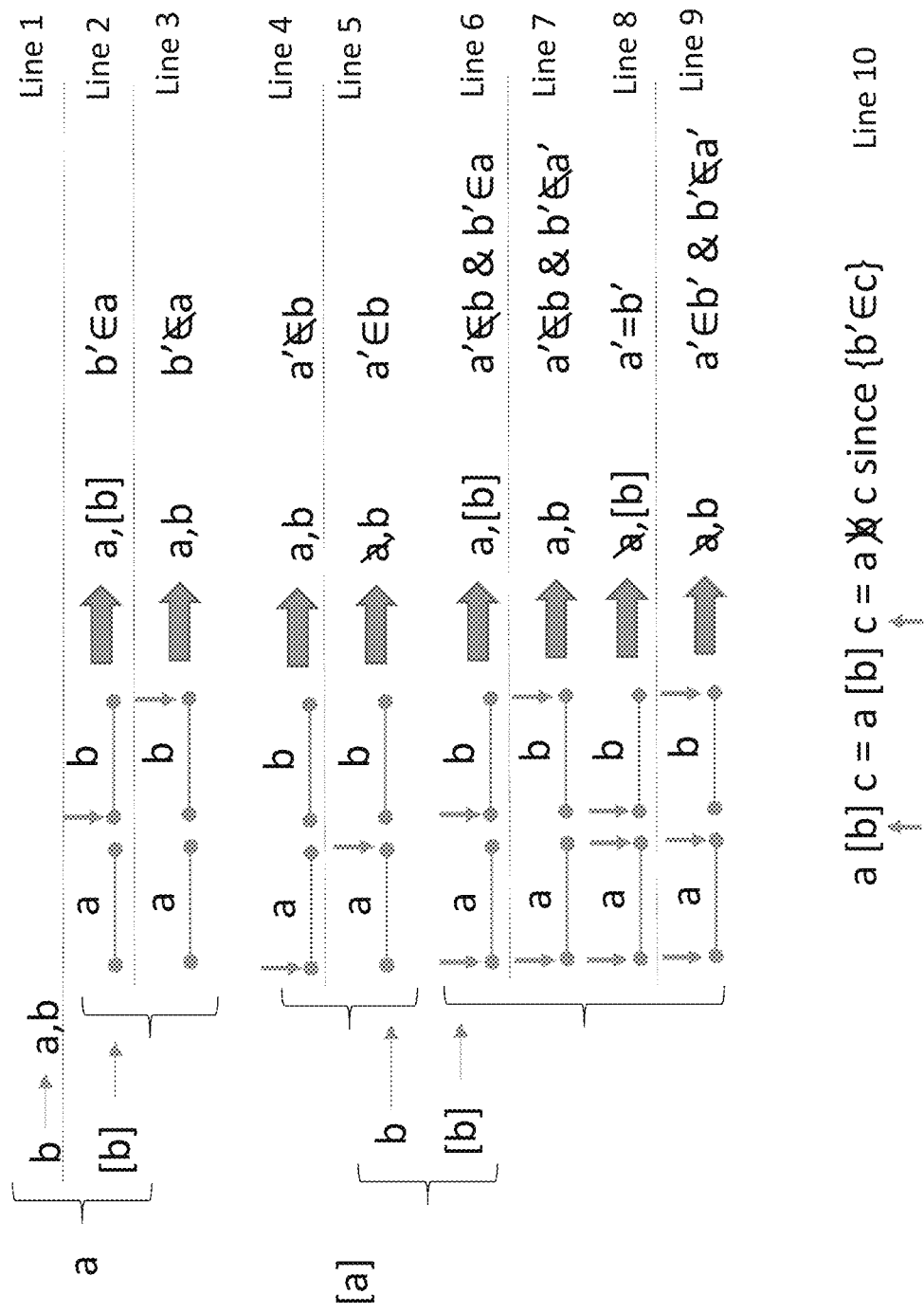
Figure 9B:
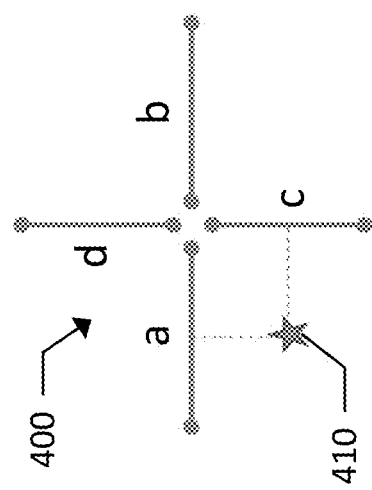

Having thus described example embodiments of the invention in general terms, reference will now be made to the accompanying drawings, which are not necessarily drawn to scale, and wherein:

FIG. 1 illustrates a communications diagram in accordance with an example embodiment of the present invention;

FIG. 2 is a block diagram of an apparatus that may be specifically configured for generating and revising map geometry based on probe data in accordance with an example embodiment of the present invention;

FIG. 3 illustrates a map including road centerlines and raw probe data points according to an example embodiment of the present invention;

FIG. 4 illustrates a map including road centerlines and map matched probe data points according to an example embodiment of the present invention;

FIG. 5 illustrates a segment of the map of FIG. 3 including raw probe data points according to an example embodiment of the present invention;

FIG. 6 illustrates the map matched probe data points of FIG. 5 according to an example embodiment of the present invention;

FIG. 7 illustrates a path of raw probe data points overlaid on a road segment of a map according to an example embodiment described herein;

FIG. 8 illustrates the probe data points of FIG. 7 map matched to the road segment according to an example embodiment of the invention;

FIG. 9A depicts a robust decoding algorithm for map matching probe data points to road segments and nodes according to an example embodiment of the present invention;

FIG. 9B depicts a graphical representation of the roads of an intersection with a probe data point according to an example embodiment of the present invention; and FIG. 10 is a flowchart of a method for map matching probe data points to a map according to an example embodiment of the present invention.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

As defined herein, a "computer-readable storage medium," which refers to a non-transitory physical storage medium (for example, volatile or non-volatile memory device), can be differentiated from a "computer-readable transmission medium," which refers to an electromagnetic signal.

A method, apparatus, and computer program product are provided herein in accordance with an example embodiment for reliably and repeatably map-matching noisy probe data points to road segments and nodes in a manner resistant to noise and erroneous probe data location points which may be induced, for example, by global positioning system inaccuracies. Embodiments described herein are uniquely capable of map-matching probe data whose location does not fall within a road segment boundary and may not be readily map matched to a road segment using conventional map matching means. FIG. 1 illustrates a communication diagram of an example embodiment of a system for implementing example embodiments described herein. The illustrated embodiment of FIG. 1 includes a map developer system 116, a processing server 102 in data communication a geographic map database, e.g., map database 108 through a network 112, and one or more mobile devices 114. The mobile device 114 may be associated, coupled, or otherwise integrated with a vehicle, such as an in-dash vehicle navigation unit, a vehicle head unit, an electronic control unit, or an advanced driver assistance system (ADAS), for example. Additional, different, or fewer components may be provided. For example, many mobile devices 114 may connect with the network 112. The map developer 116 may include computer systems and network of a system operator. The processing server 102 may include the map database 108, such as a remote map server. The network may be wired, wireless, or any combination of wired and wireless communication networks, such as cellular, Wi-Fi, internet, local area networks, or the like.

Processing server 102 may be one or more fixed or mobile computing devices. The mobile device 114 may be configured to access the map database 108 via the processing server 102 through, for example, a mapping application, such that the user equipment may provide navigational assistance to a user among other services provided through access to the map developer 116.

The map database 108 may include node data, road segment data or link data, point of interest (POI) data, or the like. The map database 108 may also include cartographic data, routing data, and/or maneuvering data. According to some example embodiments, the road segment data records may be links or segments representing roads, streets, or paths, as may be used in calculating a route or recorded route information for determination of one or more personalized routes. The links or roadways may be represented by polylines, where each polyline comprises a plurality of vertices establishing the path of the roadway geometry. The node data may be end points corresponding to the respective links or segments of road segment data. The road link data and the node data may represent a road network, such as used by vehicles, cars, trucks, buses, motorcycles, and/or other entities. Optionally, the map database 108 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 108 can include data about the POIs and their respective locations in the POI records. The map database 108 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 108 can include event data (e.g., traffic incidents, construction activities, scheduled events, unscheduled events, etc.) associated with the POI data records or other records of the map database 108.

The map database 108 may be maintained by a content provider e.g., a map developer. By way of example, the map developer can collect geographic data to generate and enhance the map database 108. According to some embodiments, the map database 108 may delegate map generation and revision to other devices, such as mobile device 114. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used to generate map geometries directly or through machine learning as described herein.

The map database 108 may be a master map database stored in a format that facilitates updating, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF)) to organize and/or configure the data for performing navigation-related functions and/or services, such as route calculation, route guidance, map display, speed calculation, distance and travel time functions, and other functions, by a navigation device, such as by mobile device 114, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the server side map database 108 may be a master geographic database, but in alternate embodiments, a client side map database 108 may represent a compiled navigation database that may be used in or with end user devices (e.g., mobile device 114) to provide navigation and/or map-related functions. For example, the map database 108 may be used with the mobile device 114 to provide an end user with navigation features. In such a case, the map database 108 can be downloaded or stored on the end user device (mobile device 114) which can access the map database 108 through a wireless or wired connection, such as via a processing server 102 and/or the network 112, for example. Optionally, a portion of the map database 108, such as map data regarding a specific roadway, may be downloaded or stored temporarily on an end user device, and according to various embodiments described herein, the mobile device 114 may be configured to modify the map data regarding a roadway before sending the map data back to the map database 108.

In one embodiment, the mobile device 114 can be an in-vehicle navigation system, such as an ADAS, a personal navigation device (PND), a portable navigation device, a cellular telephone, a smart phone, a personal digital assistant (PDA), a watch, a camera, a computer, and/or other device that can perform navigation-related functions, such as digital routing and map display. A mobile device is provided for navigation and map functions such as guidance and map display, for example, and for determination of one or more personalized routes or route segments based on one or more calculated and recorded routes, according to some example embodiments.

The processing server 102 may receive probe data from a mobile device 114 or a device in communication with mobile device 114. The mobile device 114 may include one or more detectors or sensors as a positioning system built or embedded into or within the mobile device 114. Alternatively, the mobile device 114 uses communications signals for position determination. The mobile device 114 may receive location data from a positioning system, such as a global positioning system (GPS), cellular tower location methods, access point communication fingerprinting, or the like. The server 102 may receive sensor data configured to describe a position of a mobile device, or a processor of the mobile device 114 may receive the sensor data from the positioning system of the mobile device 114. The mobile device 114 may also include a system for tracking mobile device movement, such as rotation, velocity, or acceleration. Movement information may also be determined using the positioning system. The mobile device 114 may use detectors and sensors to provide data indicating a location of a vehicle. This vehicle data, also referred to herein as "probe data", may be collected by any device capable of determining the necessary information, and providing the necessary information to a remote entity. The mobile device 114 is one example of a device that can function as a probe to collect probe data of a vehicle.

More specifically, probe data (e.g., collected by mobile device 114) is representative of the location of a vehicle at a respective point in time and may be collected while a vehicle is traveling along a route. While probe data is described herein as being vehicle probe data, example embodiments may be implemented with pedestrian probe data, marine vehicle probe data, or non-motorized vehicle probe data (e.g., from bicycles, skate boards, horseback, etc.). According to the example embodiment described below with the probe data being from motorized vehicles traveling along roadways, the probe data may include, without limitation, location data, (e.g. a latitudinal and longitudinal position, and/or height, GPS coordinates, proximity readings associated with a radio frequency identification (RFID) tag, or the like), rate of travel, (e.g. speed), direction of travel, (e.g. heading, cardinal direction, or the like), device identifier, (e.g. vehicle identifier, user identifier, or the like), a time stamp associated with the data collection, or the like. The mobile device 114, may be any device capable of collecting the aforementioned probe data. Some examples of the mobile device 114 may include specialized vehicle mapping equipment, navigational systems, mobile devices, such as phones or personal data assistants, or the like. Probe data collected by a mobile device 114 may be error prone, where probe data location information may not correspond precisely with the actual physical location of the probe. For example, probes traveling through urban canyons, forests, or actual canyons may have probe data point locations that are very noisy in that they do not correspond well with the actual location of the probe due to signal noise and issues with locationing means for detecting the location of the probe. Embodiments described herein are well suited to receive noisy probe data points that do not fall ideally onto a road link and may be displaced substantially from the actual location of the probe along a road link.

An example embodiment of a processing server 102 may be embodied in an apparatus as illustrated in FIG. 2. The apparatus, such as that shown in FIG. 2, may be specifically configured in accordance with an example embodiment of the present invention for map matching raw probe data to road segments and nodes, even when the raw probe data is noisy and may not be properly map matched using conventional map matching techniques. The apparatus may include or otherwise be in communication with a processor 202, a memory device 204, a communication interface 206, and a user interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor 202). The memory device may be configured to store information, data, content, applications, instructions, or the like, for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor specific device (for example, a mobile terminal or a fixed computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 200 of an example embodiment may also include a communication interface 206 that may be any means such as a device or circuitry embodied in either hardware or a combination of hardware and software that is configured to receive and/or transmit data to/from a communications device in communication with the apparatus, such as to facilitate communications with one or more mobile devices 114 or the like. In this regard, the communication interface may include, for example, an antenna (or multiple antennae) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware and/or software for supporting communication via cable, digital subscriber line (DSL), universal serial bus (USB) or other mechanisms.

The apparatus 200 may also include a user interface 208 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, one or more microphones, a plurality of speakers, or other input/output mechanisms. In one embodiment, the processor may comprise user interface circuitry configured to control at least some functions of one or more user interface elements such as a display and, in some embodiments, a plurality of speakers, a ringer, one or more microphones and/or the like. The processor and/or user interface circuitry comprising the processor may be configured to control one or more functions of one or more user interface elements through computer program instructions (for example, software and/or firmware) stored on a memory accessible to the processor (for example, memory device 204, and/or the like).

Example embodiments of the present invention may provide a mechanism for map matching noisy probe data points which may, in turn, provide a mechanism for revising map information (e.g., stored in map database 108) using probe data (e.g., from mobile device 114) from a plurality of vehicles traveling along one or more roadways in a particular geographic region. Map information, such as paths of roadways, direction of traffic on said roadways, intersections, and the like may be stored, for example, in map database 108. As roadway infrastructure is subject to deterioration over time, road construction on existing roadways is an inevitable event that will alter roadways at least temporarily. Further, increases in population and vehicular traffic result in the need for new or expanded roadways, while other roadways may be removed or replaced. The term "roadways," as used herein, may refer to any path a vehicle may take in moving from one place to another. Roadways may be paved, improved roadways, gravel roadways, dirt trails, or the like, such that roadways does not imply that the mapped roads are necessarily recognized as county, state, or federally maintained roads, and may include private roadways such as access roads, neighborhood streets, and the like. As these roadways may change over the course of time, map information related to these roadways may require revision to keep up with the changes to the roadway paths.

Example embodiments described herein provide a mechanism to reliably and repeatably map match noisy probe data and trajectories including probe data points to road segments and nodes of a road network. Position data, which may be received from probes traveling along a road network from sensors such as global positioning system (GPS) sensors is widely available and provides a frequently updated or "fresh" resource in the map making industry to identify map attributes such as traffic patterns, road segment geometry, road directionality, road segment speed limits, etc. As part of the raw position data or location data, map-matching the data may be instrumental in properly correlating probe data points to a road segment along which the probe is traveling. Embodiments described herein provide a mechanism to mitigate noise from probe data points that improperly report their location while matching the probe data points to road segments with a relatively high degree of accuracy. While embodiments described herein are capable of mitigating noise in noisy probe data, embodiments may also map match probe data that lacks noise and is relatively accurate such that embodiments of the present invention are versatile and may be implemented to map match any probe data.

Mobile devices 114 may function as probes to generate probe data points traveling along a roadway by reporting their location in the form of probe data points. These probe data points may include various information beyond location, such as heading, speed, vehicle identification, vehicle type, or the like. However, in the case of location, the location may be established as an absolute location, including latitude and longitude. A single probe may generate a trajectory, which includes two or more probe data points that provide an indication of location and heading of a probe (e.g., mobile device 114 and/or vehicle, for example), and may optionally provide substantially more information, such as speed of travel or traffic congestion along road segment(s) corresponding to the identified trajectory. However, in order to provide such information, the probe data points and trajectories must be properly associated or "map matched" to the correct road segment or node at the end of a road segment.

Noise-resistant map matching techniques as described herein may be decoupled from the maps within the map database such that embodiments described herein may be used for map-matching to any map database, whether it is a tile-based map database, a standard interchange format, geographic data files, or the like. Trajectories or sequences of probe data points from a single probe including a plurality of probe data points may be truncated according to algorithms described herein to allow the incorporation of rules to identify trajectory transitions that are not feasible from one candidate probe data point to another. Embodiments eliminate unreasonable trajectories through evaluation strategies that identify unlikely, improbable, or unreasonable transitions between probe data points, thereby mitigating noise and error-prone probe data points.

Embodiments described herein may use a directed graph to model a road network. The shortest traversal distance that must be inferred between the probe data points and the map of the road network may be used to measure the matched performance of a given trajectory. This is in lieu of using a confidence value on a defined probability function including transition and emission functions for map matching. FIG. 3 illustrates a road network map with map information including link, node, and direction of travel. The link and node information is represented by the dashed lines 310 depicting road or lane centers within the road network which is overlaid on a map 320. A probe trajectory 330 is also illustrated including a list of probe data points with time stamps sorted in an ascending order within the road network. FIG. 4 illustrates the probe data point trajectories 335 of FIG. 3 once map-matched to the road segments and nodes of the map represented by the dashed lines 310. Each snap point is a map-matched position of one probe data point onto a road segment or link.

During conventional map-matching, the probe data points and trajectories 330 of FIG. 3 may pose issues relating to determining which road segments the probe is traveling along. FIG. 5 illustrates one such potential issue, where trajectory 340 suggests that the probe traveled from road segment 345 to road segment 350, turned around or performed a U-turn on road segment 350, before returning to road segment 355. While all of the probe data points of the probe trajectory are noisy to some degree, the probe data point 342 is noisy and particularly problematic as it diverges from an actual path taken by the probe along road 345 and falls on another road link 350. Noisy probe data that falls outside of the bounds of a road link in an area that is sparsely populated with road links may be more readily map matched as there are few options for road links to map match the probe data point to. However, in dense areas, noisy probe data can be erroneously map matched to incorrect roads even with a relatively slight deviation from the actual path of the probe. Embodiments described herein provide a map matching technique that is resistant to noisy probe data points and able to map match probe data points to their appropriate road link despite noise. FIG. 6 illustrates an example of how the probe data points and trajectories of FIG. 5 may be map-matched to a series of road links using conventional map matching methods. However, it is unlikely that the probe actually traveled along road segment 350, and that map matching methods and algorithms described herein are configured to determine erroneous map matched trajectories and exclude them from the route of the trajectories, or to correct the map-matched trajectories to the determined route.

Conventional map matching may use a model, such as a Hidden Markov model to determine emission probabilities using a Gaussian distribution. In accordance with an example embodiment, however, the emission probability should not be defined as the general Gaussian distribution over the distance between the probe data point and its snap point (to which it is map-matched). If the emission probability is defined as the general Gaussian distribution, the map matching will generate an erroneous path as illustrated in FIG. 6 along road segment 350.

Embodiments described herein may further avoid missing a correct snap point—a point along a road segment to which a probe data point is matched—for a probe data point when a large error exists in the location identified by the probe data point. Such a probe data point may be map matched to the appropriate road segment through a dynamic search where a search radius around the given probe data point is iteratively increased to search for map matching candidates. Candidates are iteratively searched by increasing the radius in periodic steps up to an upper limit for the radial distance, or until at least two candidates are found. While non-noisy probe data points may be map matched using a fixed radius around the probe data point and map matching the probe data point to a road link found within the fixed radius, the dynamic search method described herein begins with a first predetermined radius about a probe data point in an effort to find a road link to map match the probe data point to. The search radius is iteratively increased until a predefined maximum radius is reached, or at least two candidates for map matching are found. This method of iteratively increasing a radius around a probe data point to find map matching candidates may be a reliable and repeatable means for map matching noisy probe data points to road segments.

Conventional map matching techniques may also be deficient when map matching noisy probe data points and trajectories on single-direction roadways. Problematically, a probe vehicle is highly unlikely to make a U-turn on a single direction road, despite a sequence of probe data points reversing course. Probe data received at very low speeds may be erroneous, and may produce a sequence of probe data points that changes direction. Embodiments described herein use a speed threshold, below which probe data points may be considered unreliable, particularly if they do not conform to a logical route, and therefore may be discarded. FIG. 7 illustrates an example embodiment of a single-direction roadway 360 along which a probe has traveled depicted by probe data points 375, represented by arrows that include the heading of the respective probe data points. The digital map data road segment centerline 365 is overlaid on the roadway 360. The route or path taken based on the probe data points is shown by line 370. However, in the illustrated embodiment, the probe data points within circle 380 have an associated speed below a threshold, such as five kilometers per hour. This may occur when a vehicle slows along a roadway due to traffic, to drop-off or pick-up a passenger, or otherwise slow/stop along the road segment 360. Due to the low speed associated with probe data points within 380, those probe data points may be discarded. FIG. 7 illustrates the path 370 represented by the probe data points once the probe data points having a speed below a threshold speed are filtered out.

While filtering probe data points having associated speeds below a predetermined threshold may eliminate some erroneous probe data from contributing to a path or route, other filtering methods may be implemented to further refine the probe data points and ensure accurate and repeatable map matching of probe data points and trajectories. One such example may include filtering out probe data points that represent infeasible scenarios of movement or highly unlikely probe data point sequences. For example, for two successive probe data points $p_t$ and $p_{t+1}$, the traversal distance on a road network may be greater than the maximum distance the probe can travel in an amount of time between the two probe data points. The maximum probe data point speed of $p_t$ and $p_{t+1}$ may be multiplied by the time difference between t and t+1 to determine if the distance between $p_t$ and $p_{t+1}$ is reasonable. This may be represented by:

$$\max(p_t\cdot\text{speed}, p_{t+1}\cdot\text{speed}) \times (p_{t+1}\cdot\text{time} - p_t\cdot\text{time})$$

If the maximum speed reported among two probe data points is 50 kilometers per hour (equivalent to 13.9 meters per second) and the time between the two probe data points is 10 seconds, a distance of 139 meters would be reasonable, while a distance of 400 meters would be unreasonable, and thus it is evident that the probe data is erroneous.

In order to determine which probe data points are likely to be erroneous, embodiments described herein may establish a rule for eliminating probe data points. The rule may be based upon the maximum speed of the probe data points and the time between the data points. In that manner, if a distance between two probe data points is greater than a predefined multiple of, such as four times, the maximum speed of those probe data points multiplied by the time between the data points, the trajectory including those probe data points may be discarded. This may be represented according to the following equation:

$$\text{distance}(p_t, p_{t+1}) > 4 \max(p_t\cdot\text{speed}, p_{t+1}\cdot\text{speed}) \times (p_{t+1}\cdot\text{time} - p_t\cdot\text{time})$$

This criterion ensures that a trajectory will be discarded if deemed unreasonable, and prohibited in the Viterbi algorithm that finds the most likely sequence in a Viterbi path. If all trajectories in a sequence are deemed unreasonable, the Viterbi algorithm will end a first Viterbi path at $p_t$, and a new, independent path will begin at $p_{t+1}$. The distance between two probe points may be the distance as measured along a road segment to which the probe data points have been matched. The distance may be measured as the distance between the probe data points as if a vehicle was driving between the probe data points, such that probe data points captured along roads that double-back on one another, such as "switchback roads" that ascend an incline such as a mountain may be physically closer than the distance between the two probe points along the road segment.

While the aforementioned embodiment describes a multiplier of four used to establish an unrealistic probe data point difference in location given the relative speeds, embodiments may be specifically configured with a multiplier based on a variety of circumstances. For example, the multiplier may be higher in a geographic region that has dense urban traffic as vehicle speeds may change dramatically between probe data points, and two probe data points with very low vehicle speeds may not be an accurate representation of the average speed of the probe between the probe data point locations. In other scenarios, such as in rural environments, the multiplier may be lower than four as probe/vehicle speeds may be more consistent with less likelihood of traffic of speed variation. Further, the multiplier may be tuned by a map developer or map service provider based on feedback regarding map matching accuracy or a volume of probe data being discarded due to violating the equation above. Thus, the multiplier may vary widely based on the specific road classes, geographic region, map service provider determination, or the like.

Embodiments described herein may mitigate erroneous probe data points through truncation of a trajectory into segments, and matching each segment separately. A trajectory includes a sequence of probe data points, such that subdividing the trajectory into smaller trajectory segments allows the map matching of the trajectory segments that are determined to be reliable while allowing trajectory segments including probe data that is determined to potentially be erroneous to be discarded, leaving fewer portions of a path that must be inferred, and rendering those portions shorter.

According to example embodiments in which there are multiple substantially parallel roads as candidates for matching, but the substantially parallel roads have different directions, embodiments described herein match the heading of the probe data points with the bearing of the link segments representative of the multiple parallel roads. An angle of less than 90 degrees between the bearing of the road segment and the heading of the probe data points indicates that the probe data points and the respective road segment are potential candidates for matching. This provides a clear improvement when map matching to a directed road network versus an undirected road network. In this embodiment, roads may be considered substantially parallel in an instance in which the roads deviate from parallel by no more than a predefined parallelism threshold, such as 5 degrees.

Another feature described herein to provide accurate map matching despite noisy probe data points is to remove probe data points within an intersection and nearby points to speed up the map matching process. Probe data points around an intersection may be ambiguous such that they are often unreliable. Probe data points near an intersection have little effect on the road segments to which probe data points are map matched. This strategy enables faster map matching by removing probe data points around an intersection from those requiring map matching.

According to the methods described herein, map matching probe data points to nodes is preferred over matching probe data points to road segments. Map matching probe data points to road segments instead of nodes introduces a greater potential for error. A probe data point can be map matched to the wrong road segment, though the road segment may have a shared node with the correct road segment. This leads to an incorrect path being generated for a sequence of probe data points. While embodiments described herein may discount probe data points proximate intersections, embodiments may optionally map match probe data points proximate intersections using a robust algorithm to reliably map match the probe data points. It is further noted that the robust algorithm described below, while being useful for map matching proximate an intersection, may also map match probe data points that are not near an intersection.

FIG. 9A illustrates a logical flow diagram of an algorithm of example embodiments for map matching probe data points to road segments and nodes in a robust manner that helps eliminate noise and accurately map matches probe data points efficiently. Typically, probe data points are map matched to the road segment or node closest to the probe data point. However, the road segment to which a probe data point is map matched can be incorrect, particularly in cases where a probe data point is map matched to a node that is shared between the correct road segment and an incorrect road segment, where the incorrect road segment may be selected as the appropriate match. This results in an incorrect path of road segments for the probe According to the illustrated embodiment of FIG. 9A, an algorithm for establishing the path of a probe is depicted where a deterministic link or road segment is denoted in the algorithm using its symbol (e.g., "a" represents deterministic location on link a), while a non-deterministic link is denoted using brackets (e.g., "[a]" represents a non-deterministic location on link a). The prime symbol of a' and b' in FIG. 9A denotes a node of a link, such that a' is one of the two nodes of link a. In the illustrated algorithm of FIG. 9A, an arrow denotes a map matched probe location, such as the arrow pointing to the first node of segment b in line 2. The illustrated links in lines 1-9 include nodes at either end of a road link. These roads are part of the intersection graphically represented at 400 with probe data point 410.

As shown in the algorithm of FIG. 9A, when a is deterministic and b is deterministic, the result is a path "a,b" as shown in line 1. However, when a is deterministic, and b is not, as shown in lines 2 and 3, two possibilities exist. As shown in line 2, a probe data point at the first node of link b, where link b meets link a, results in "a,[b]" since the location at node b' is not deterministic since that location could also belong to link a. Thus, b' is within the set of locations that corresponds to link a. In line 3, the probe data point location is established as the other node of link b, such that b' is deterministic since b' is not within the set of locations that corresponds to a. When the probe data point on link a is not deterministic, the location on link b may or may not be deterministic. When link b is deterministic, and the probe data location corresponds to a node of link a (a') that does not coincide with link b, both a and b are deterministic as a' is not in the set of link b, as shown on line 4. When the probe data point location is at the node of a which coincides with link b, node a' is within the set of link b, but since b is deterministic, and the match to link a is discarded resulting in a map match to only link b.

Referring again to FIG. 9A, when b is not deterministic, as shown beginning at line 6, node a' is not in the set of link b, and node b' is in the set of link a, thus a become deterministic and b remains non deterministic: a,[b]. When probe data locations from a trajectory indicate a location at the node of a that does not coincide with link b, and a location at the node of link b that does not coincide with link a, both locations become deterministic for path a,b, as shown in line 7. Line 8 illustrates an example embodiment of three locations including map matching to both nodes of link a, and the node of link b shared with link a. The map matched location of line 8 is non-deterministic link a and non-deterministic link b. For line 9, similar to line 8, link a remains non-deterministic, but link b is deterministic since the location matches to the node of link b not shared with link a. Line 10 of the algorithm illustrates the example embodiment of the intersection 400 with probe data point 410 graphically depicted in FIG. 9B. As shown, the probe is matched to a', b, and c'. Link b is not deterministic, and is redundant between links a and c, such that non-deterministic link b may be dropped from the map matching to result in a map match to links a and c for the trajectory.

FIG. 10 is a flowchart illustrative of a method according to example embodiments of the present invention. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 204 of an apparatus employing an embodiment of the present invention and executed by a processor 202 of the apparatus. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions that execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems that perform the specified functions, or combinations of special purpose hardware and computer instructions.

FIG. 10 illustrates a flowchart depicting a method of map matching probe data points to road segments and nodes of a road network. As shown, a plurality of probe data points are received at 700. The probe data points may be received from a probe apparatus of among a plurality of probe apparatuses, each probe apparatus including one or more sensors and being onboard a respective vehicle. Each probe data point may include at least location information associated with the probe apparatus. A search for map match candidates may begin at 710 for each probe data point. At 720, the search is conducted within a predefined radius of each probe data point location for candidate road segments or nodes. If candidates are not found at 730, the search radius is increased at 740 and the search is conducted again. This iterative increase in the search radius continues until a maximum radius is reached or candidates are found. Once candidates are found at 730, each probe data point is map matched to a candidate road segment or candidate node at 750. A path is generated based on the map matched probe data points from a respective probe apparatus at 760. The map matched path is stored at 770, and map data is updated based on the map matched path at 780. The updated map data is used for at least one of route navigation or at least semi-autonomous driving at 790.

In an example embodiment, an apparatus for performing the method of FIG. 11 above may comprise a processor (e.g., the processor 202) configured to perform some or each of the operations (700-790) described above. The processor may, for example, be configured to perform the operations (700-

790) by performing hardware implemented logical functions and/or executing stored instructions for performing each of the operations. Alternatively, the apparatus may comprise means for performing each of the operations described above. In this regard, according to an example embodiment, examples of means for performing operations 700-790 may comprise, for example, the processor 202 and/or a device or circuit for executing instructions for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A mapping system comprising:
a memory comprising map data; and
processing circuitry configured to:
receive a plurality of probe data points, each probe data point received from a respective probe apparatus of a plurality of probe apparatuses, each probe apparatus comprising one or more sensors and being onboard a respective vehicle, wherein each probe data point comprises location information associated with the respective probe apparatus;
search for candidate road segments or nodes for each probe data point to be matched to, wherein the processing circuitry configured to search for candidate road segments or nodes comprises processing circuitry configured to:
search within a predefined radius of each probe data point for road segments or nodes; and
in response to no road segments or nodes being found within the predefined radius of the respective probe data point, iteratively increase the predefined radius and search again until a predefined maximum radius is reached or at least two road segment candidates or node candidates are found;
map match each probe data point to a respective road segment candidate or node candidate based on the road segment candidate or node candidate found in the search in response to at least two road segment candidates or node candidates being found;
generate a path based on the map matched probe data points from a respective probe;
cause storage of the map matched path in the memory;
update map data based, at least in part, on the map matched path; and
facilitate at least one of route navigation or at least semi-autonomous driving based on the updated map data.

2. The mapping system of claim 1, wherein each probe data point comprises a location, a speed, and a timestamp, wherein only probe data points satisfying a predetermined speed threshold are used to generate the path.

3. The mapping system of claim 1, wherein each probe data point comprises a location, a speed, and a timestamp, and each probe apparatus generates a sequence of probe data points, the processing circuitry further configured to:
generate a trajectory for a probe apparatus based on a first probe data point and a next probe data point in a sequence of at least two probe data points received from the probe apparatus in response to a distance between the first probe data point and the next probe data being less than a predefined multiple of the greater of the speed of the first probe data point and the next probe data point multiplied by the time difference between the first probe data point and the next probe data point.

4. The mapping system of claim 1, wherein each probe data point comprises a location, a speed, and a timestamp, and each probe apparatus generates a sequence of probe data points, the processing circuitry further configured to:
separate a first probe data point from a next probe data point in a sequence of at least two probe data points received from the probe apparatus into different trajectories for the probe apparatus in response to a distance between the first probe data point and the next probe data being more than a predefined multiple of the greater of the speed of the first probe data point and the next probe data point multiplied by the time difference between the first probe data point and the next probe data point.

5. The mapping system of claim 1, wherein the processing circuitry configured to search for candidate road segments or nodes for each probe data point to be matched to further comprises causing the apparatus to:
determine as a candidate, from two or more substantially parallel roads having different directions of travel, a road segment or node having a direction of travel that is less than ninety degrees away from a heading of the probe data point.

6. The mapping system of claim 1, wherein the processing circuitry configured to search for candidate road segments or nodes for each probe data point to be map matched to further comprises processing circuitry configured to:
determine that a respective probe data point is within a predefined distance of an intersection; and
exclude the respective probe data point from inclusion in the generation of the path in response to the probe data point being proximate the intersection.

7. The mapping system of claim 1, wherein the processing circuitry configured to map match each probe data point to a respective road segment candidate or node candidate based on the road segment candidate or node candidate found in the search comprises processing circuitry configured to discard a probe data point from the path in response to determining that a heading of the probe data point conflicts with a direction of the map matched road segment or node.

8. The apparatus of claim 1, wherein causing the apparatus to map match each probe data point to a respective road segment candidate or node candidate based on the road segment candidate or node candidate found in the search comprises causing the apparatus to discard a probe data point from the path in response to determining that a heading of the probe data point conflicts with a direction of the map matched road segment or node.

9. An apparatus comprising at least one processor and at least one memory including computer program code, the at least one memory and computer program code configured to, with the at least one cause the apparatus to at least:
- receive a plurality of probe data points, each probe data point received from a respective probe apparatus of a plurality of probe apparatuses, each probe apparatus comprising one or more sensors and being onboard a respective vehicle, wherein each probe data point comprises location information associated with the respective probe apparatus;
- search for candidate road segments or nodes for each probe data point to be matched to, wherein causing the apparatus to search for candidate road segments or nodes comprises causing the apparatus to:
  - search within a predefined radius of each probe data point for road segments or nodes; and
  - in response to no road segments or nodes being found within the predefined radius of the respective probe data point, iteratively increase the predefined radius and search again until a predefined maximum radius is reached or at least two road segment candidates or node candidates are found;
- map match each probe data point to a respective road segment candidate or node candidate based on the road segment candidate or node candidate found in the search in response to at least two road segment candidates or node candidates being found;
- generate a path based on the map matched probe data points from a respective probe;
- cause storage of the map matched path in the at least one memory;
- update map data based, at least in part, on the map matched path; and
- facilitate at least one of route navigation or at least semi-autonomous driving based on the updated map data.

10. The apparatus of claim 9, wherein each probe data point comprises a location, a speed, and a timestamp, wherein only probe data points satisfying a predetermined speed threshold are used to generate the path.

11. The apparatus of claim 9, wherein causing the apparatus to search for candidate road segments or nodes for each probe data point to be matched to further comprises causing the apparatus to:
- determine as a candidate, from two or more substantially parallel roads having different directions of travel, a road segment or node having a direction of travel that is less than ninety degrees away from a heading of the probe data point.

12. The apparatus of claim 9, wherein causing the apparatus to search for candidate road segments or nodes for each probe data point to be map matched to further comprises causing the apparatus to:
- determine that a respective probe data point is within a predefined distance of an intersection; and
- exclude the respective probe data point from inclusion in the generation of the path in response to the probe data point being proximate the intersection.

13. The apparatus of claim 9, wherein each probe data point comprises a location, a speed, and a timestamp, and each probe apparatus generates a sequence of probe data points, the apparatus further caused to:
- generate a trajectory for a probe apparatus based on a first probe data point and a next probe data point in a sequence of at least two probe data points received from the probe apparatus in response to a distance between the first probe data point and the next probe data being less than a predefined multiple of the greater of the speed of the first probe data point and the next probe data point multiplied by the time difference between the first probe data point and the next probe data point.

14. The apparatus of claim 13, wherein each probe data point comprises a location, a speed, and a timestamp, and each probe apparatus generates a sequence of probe data points, the apparatus further caused to:
- separate a first probe data point from a next probe data point in a sequence of at least two probe data points received from the probe apparatus into different trajectories for the probe apparatus in response to a distance between the first probe data point and the next probe data being more than a predefined multiple of the greater of the speed of the first probe data point and the next probe data point multiplied by the time difference between the first probe data point and the next probe data point.

15. A method comprising:
- receiving a plurality of probe data points, each probe data point received from a respective probe apparatus of a plurality of probe apparatuses, each probe apparatus comprising one or more sensors and being onboard a respective vehicle, wherein each probe data point comprises location information associated with the respective probe apparatus;
- searching for candidate road segments or nodes for each probe data point to be matched to, wherein searching for candidate road segments or nodes comprises:
  - searching within a predefined radius of each probe data point for road segments or nodes; and
  - in response to no road segments or nodes being found within the predefined radius of the respective probe data point, iteratively increasing the predefined radius and searching again until a predefined maximum radius is reached or at least two road segment candidates or node candidates are found;
- map matching each probe data point to a respective road segment candidate or node candidate based on the road segment candidate or node candidate found in the search in response to at least two road segment candidates or node candidates being found;
- generating a path based on the map matched probe data points from a respective probe;
- causing storage of the map matched path in a memory;
- updating map data based, at least in part, on the map matched path; and
- facilitating at least one of route navigation or at least semi-autonomous driving based on the updated map data.

16. The method of claim 15, wherein each probe data point comprises a location, a speed, and a timestamp, wherein only probe data points satisfying a predetermined speed threshold are used to generate the path.

17. The method of claim 15, wherein searching for candidate road segments or nodes for each probe data point to be matched to further comprises:
- determining as a candidate, from two or more substantially parallel roads having different directions of travel, a road segment or node having a direction of travel that is less than ninety degrees away from a heading of the probe data point.

18. The method of claim 15, wherein searching for candidate road segments or nodes for each probe data point to be map matched to further comprises:

determining that a respective probe data point is within a predefined distance of an intersection; and excluding the respective probe data point from inclusion in the generation of the path in response to the probe data point being proximate the intersection.

19. The method of claim 15, wherein each probe data point comprises a location, a speed, and a timestamp, and each probe apparatus generates a sequence of probe data points, the method further comprising:

generating a trajectory for a probe apparatus based on a first probe data point and a next probe data point in a sequence of at least two probe data points received from the probe apparatus in response to a distance between the first probe data point and the next probe data being less than a predefined multiple of the greater of the speed of the first probe data point and the next probe data point multiplied by the time difference between the first probe data point and the next probe data point.

20. The method of claim 19, further comprising:

separating a first probe data point from a next probe data point in a sequence of at least two probe data points received from the probe apparatus into different trajectories for the probe apparatus in response to a distance between the first probe data point and the next probe data being more than a predefined multiple of the greater of the speed of the first probe data point and the next probe data point multiplied by the time difference between the first probe data point and the next probe data point.

* * * * *

UNITED STATES PATENT AND TRADEMARK OFFICE
CERTIFICATE OF CORRECTION

PATENT NO. : 11,015,941 B2
APPLICATION NO. : 15/990264
DATED : May 25, 2021
INVENTOR(S) : Mao et al.

Page 1 of 1

It is certified that error appears in the above-identified patent and that said Letters Patent is hereby corrected as shown below:

In the Claims

Column 21,
Line 4, "with the at least one cause the apparatus" should read --with the at least one processor, cause the apparatus--.

Signed and Sealed this
Twelfth Day of July, 2022

Katherine Kelly Vidal
*Director of the United States Patent and Trademark Office*